United States Patent
Steffen

(10) Patent No.: US 6,794,632 B1
(45) Date of Patent: Sep. 21, 2004

(54) SOIL COMPACTION DEVICE HAVING A LIGHT DETECTOR

(75) Inventor: Michael Steffen, Stockdorf (DE)

(73) Assignee: Wacker Construction Equipment AG, Munich (DE)

( * ) Notice: Subject to any disclaimer, the term of this patent is extended or adjusted under 35 U.S.C. 154(b) by 38 days.

(21) Appl. No.: 10/031,762

(22) PCT Filed: Jul. 20, 2000

(86) PCT No.: PCT/EP00/06959

§ 371 (c)(1),
(2), (4) Date: Apr. 25, 2002

(87) PCT Pub. No.: WO01/08310

PCT Pub. Date: Feb. 1, 2001

(30) Foreign Application Priority Data

Jul. 21, 1999 (DE) .......................................... 199 34 186

(51) Int. Cl.[7] .............................................. G08M 7/00
(52) U.S. Cl. ................................. 250/221; 250/214 AL
(58) Field of Search ........................ 250/221, 214 AL, 250/214 SW

(56) References Cited

U.S. PATENT DOCUMENTS

| | | | | |
|---|---|---|---|---|
| 5,210,996 A | * | 5/1993 | Fassauer | 56/12.8 |
| 5,319,250 A | | 6/1994 | Windsor | 307/139 |
| 5,367,158 A | | 11/1994 | Herman et al. | 250/221 |

FOREIGN PATENT DOCUMENTS

FR  2 674 077  9/1992

* cited by examiner

*Primary Examiner*—Thanh X. Luu
(74) *Attorney, Agent, or Firm*—Boyle Fredrickson Newholm Stein & Gratz S.C.

(57) ABSTRACT

The invention relates to an operating device which is provided for operating an appliance and which comprises a hand-actuated operating part on which at least one light detector is provided in the gripping area of the hand. The light detector and an evaluating circuit make it possible to detect when a hand is approaching the guide handle or when the hand is gripping the same. The evaluating circuit accordingly activates a control device which optionally places the appliance in operation.

8 Claims, 2 Drawing Sheets

SOIL COMPACTION DEVICE HAVING A LIGHT DETECTOR

BACKGROUND OF THE INVENTION

1. Field of the Invention

This invention pertains to a soil compaction device.

2. Description of the Related Art

To control or steer work equipment, all types of guide handles, control levers, safety handles, switches, pushbuttons and the like are used. What is common to most of these control elements is that the operator initiates the desired action through the introduction of force to a control system using his hand. If necessary, other safety elements are provided that the operator must activate, such as pressure handles or the like, so as to guarantee that the operator is holding the work equipment securely, thus preventing danger caused by the work equipment when it malfunctions or fails to operate. Moreover, there are also tactile, capacitive, ultrasound and infrared sensors that determine the existence or proximity of the hand to the operating element.

The various control devices of this type have different disadvantages: in the case of safety handles, switches or pushbuttons, a moving actuator has to be held by hand, which leads to a tiring of the hand over time. Furthermore, a solid hand grip, which is usually required, can lead to the transmission of vibrations to the hand and arm of the operator. The sensors are partially sensitive to noise or cannot be used when using gloves.

In FR-A-2 674 077, for example, an optical switch control device is described that can adjust to changing surrounding light conditions.

In U.S. Pat. No. 6,319,250, an equipment guide handle is disclosed that is steered by placing both hands of the operator on the handle in order to guarantee that the hands are located on the handle.

OBJECTS AND SUMMARY OF THE INVENTION

The objective of this invention is to provide a soil compaction device that can reliably determine that a hand is located at a control element, in particular a guide handle, even with heavy shaking without having to apply any force by hand.

This objective is met according to the invention by a soil compaction device with the features of patent claim 1. Further advantageous developments of the invention can be found in the dependent claims.

According to the invention, a soil compaction device has a guide handle provided with at least one light detector in the area gripped by the hand, said light detector emitting a signal corresponding to the brightness (brightness signal), wherein the light detector is coupled to an evaluation circuit that can evaluate the brightness signal in such a way that when a prescribed brightness threshold is exceeded or is not met, a control signal is sent to a control unit of the device. Also, the brightness threshold can be variably adjusted by the evaluation circuit according to the surrounding conditions, with a surrounding light detector that is coupled to the evaluation circuit being provided outside the grip area of the hand to determine the surrounding conditions.

This type of soil compaction device makes it possible, by merely moving the operator's hand to the vicinity of the control element (guide handle), to change the amount of light incident on the light detector, which then detects the change and reports it to the evaluation circuit. If the operator grips the control element with his hand, the light detector is blacked-out and for the most part separated from the outside brightness given off by the sun or by an artificial light source. By blacking out the light detector, thus changing the brightness signal, it can be reliably determined that a hand has approached the control element.

It is preferred that the light detector operate according to photoelectrical or photo-resistive principles, so that the brightness signal changes in strength when light hits it.

In the process, the light detector contains no light-emitting element, i.e. no additional light source, at the control element, which considerably increases its sensitivity to noise.

As already mentioned, the brightness threshold is variably adjustable by the evaluation circuit depending on the surrounding conditions. For this purpose, the evaluation circuit can be coupled to an additional surrounding light detector that detects the absolute surrounding brightness. When the brightness determined by the light detector at the control element falls below a brightness threshold determined according to the absolute brightness, this can be interpreted by the evaluation circuit as the approach of a hand to the control element. This prevents influences caused by the surrounding brightness since it can vary greatly (twilight, direct sunlight).

In an especially advantageous embodiment of the invention, a number of light detectors are provided at the control element at a minimum of two points in the grip area for both hands. In this way, the evaluation circuit coupled with the light detectors is able to determine that both hands are on the control element, which is prescribed for certain work equipment for safety reasons.

The soil compaction device is, for example, a tamper, a vibration plate or a vibration roller. Soil compaction devices are subject to severe loads during rough construction site use, resulting in the rapid failure of numerous known control devices, or resulting in the need for considerable design effort. However, the light detectors proposed according to the invention can be well protected from the environment and protected against contamination or destruction by integrating them into the control element.

BRIEF DESCRIPTION OF THE DRAWING

This and other advantages of the present invention are explained in more detail below with the help of an example illustrated in the drawings in which.

DETAILED DESCRIPTION OF THE PREFERRED EMBODIMENTS

Figure 1:
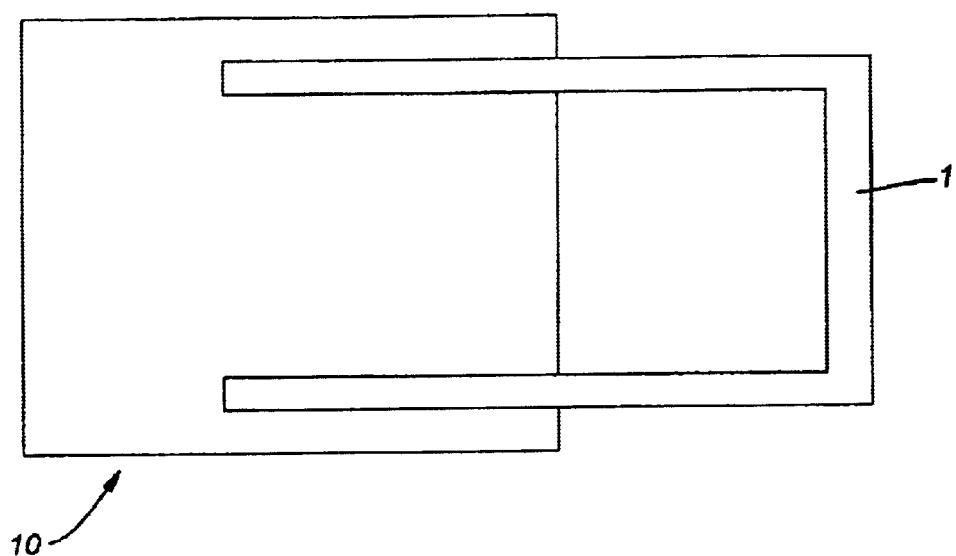
FIG. 1 schematically shows a schematic plan view of soil compaction device guided by a guide handle on which a control element constructed in accordance with the present invention is attached.
Figure 2:
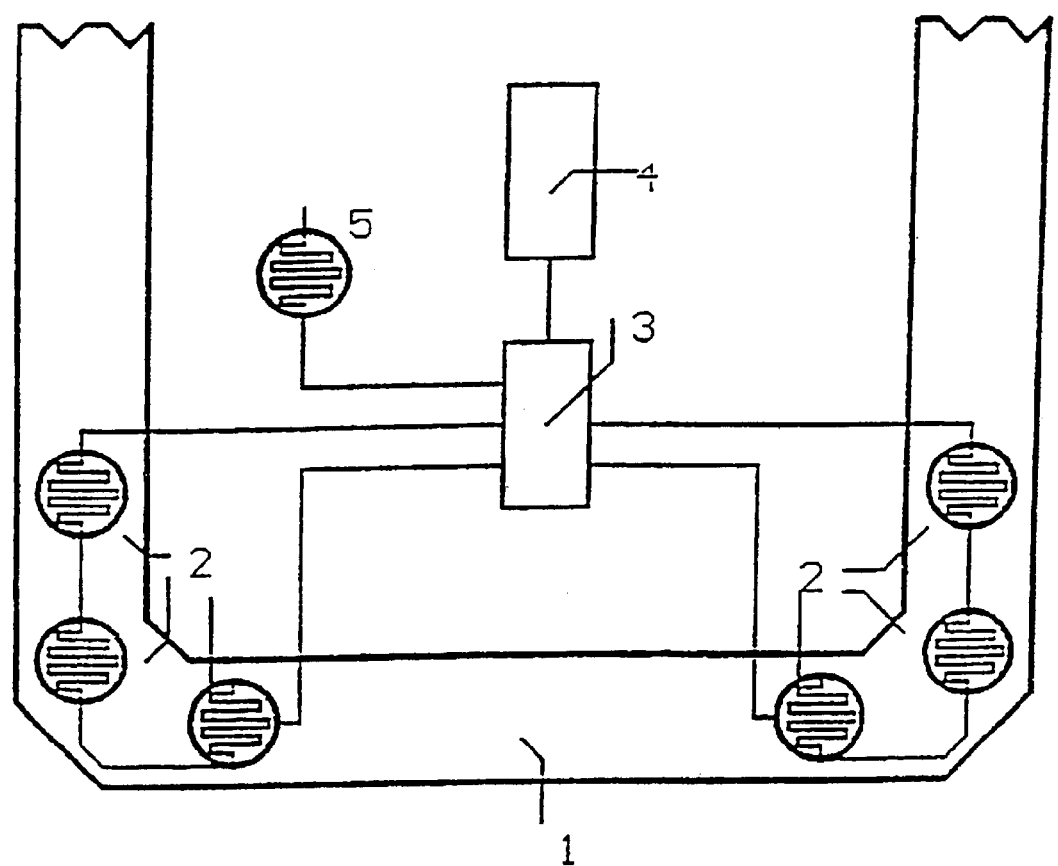
FIG. 2 schematically shows a plan view of the guide handle of FIG. 1.

FIG. 2 shows a schematic plan view of a guide handle 1, which is the control element attached at a point not shown to a soil compaction device 10 (FIG. 1) to be operated.

There are a number of light detectors 2 attached to the guide handle 1 at points where the operator commonly holds the guide handle 1 with both hands. Suitable as light detectors 2 are light-sensitive elements such as photo diodes, photo transistors, light-sensitive resistors (LDR, light-dependent-resistor) and similar systems that change electrically due to optical excitation.

DETAILED DESCRIPTION OF THE PREFERRED EMBODIMENTS

The light detectors 2 are powered by an evaluation circuit 3, which also evaluates the brightness signals given off by the light detectors 2. In the evaluation circuit 3, the brightness signals are compared to a brightness threshold. Depending on the results of the comparison, i.e. if the prescribed brightness threshold is not met or is exceeded, a corresponding control signal is sent to a control unit 4 of the soil compaction device. This control signal can, for example, correspond to the signal that is produced when securely holding a conventional safety handle.

What is claimed is:

1. A soil compaction device comprising: a guide handle provided with at least one light detector in an area gripped by a hand, said light detector emitting a signal corresponding to a brightness, wherein the light detector is coupled to an evaluation circuit that can evaluate the brightness signal in such a way that when a prescribed brightness threshold is either exceeded or is not met, a control signal is sent to a control unit of the soil compaction device, and wherein the brightness threshold can be variably adjusted by the evaluation circuit according to surrounding conditions via a surrounding light detector that is coupled to the evaluation circuit and is provided outside the grip area of the hand to determine the surrounding conditions.

2. A soil compaction device according to claim 1, wherein the light detector at the guide handle does not contain a light-emitting element.

3. A soil compaction device according to claim 1, wherein the light detector at the guide handle is a photodiode, a phototransistor or a light-sensitive resistor.

4. A soil compaction device according to claim 1, wherein a number of light detectors are provided at the guide handle at a minimum of two places in grip areas of both hands.

5. A soil compaction device comprising:

a guide handle;

at least one light detector located on said guide handle in an area configured to be gripped by a hand of an operator, said light detector emitting a signal corresponding to a brightness;

a control unit; and an evaluation circuit that is coupled to said light detector, wherein said evaluation circuit is configured to evaluate the brightness signal in such a way that when the brightness signal either exceeds or falls below a prescribed brightness threshold, a control signal is sent to the control unit of the soil compaction device; and a surrounding light detector that is coupled to the evaluation circuit, that is provided outside the grip area of the handle, i.e., and that is configured to determine surrounding conditions, wherein the evaluation circuit can variably adjust the brightness threshold according to the surrounding conditions detected by the surrounding light detector.

6. A soil compaction device according to claim 5, wherein the light detector at the guide handle does not contain a light-emitting element.

7. A soil compaction device according to claim 5, wherein the light detector is selected from the group consisting of a photodiode, a phototransistor and a light-sensitive resistor.

8. A soil compaction device according to claim 5, wherein a plurality of light detectors are provided at a minimum of two places on the guide handle that are configured to be in areas gripped by both hands of an operator.

* * * * *